(No Model.) 2 Sheets—Sheet 1.

M. SCHIRMAN.
TALKING BOARD.

No. 520,616. Patented May 29, 1894.

WITNESSES
Dan'l Fisher
Ralph J. Schirman

INVENTOR
Moritz Schirman (No Model.)  2 Sheets—Sheet 2.

M. SCHIRMAN.
TALKING BOARD.

No. 520,616.  Patented May 29, 1894.

WITNESSES  
Dan'l Fisher  
Geo. E. Taylor

INVENTOR  
Moritz Schirman

UNITED STATES PATENT OFFICE.

MORITZ SCHIRMAN, OF BALTIMORE, MARYLAND.

TALKING-BOARD.

SPECIFICATION forming part of Letters Patent No. 520,616, dated May 29, 1894.

Application filed June 25, 1892. Renewed January 8, 1894. Serial No. 496,186. (No model.)

*To all whom it may concern:*

Be it known that I, MORITZ SCHIRMAN, of the city of Baltimore and State of Maryland, have invented certain Improvements in Talking-Boards, of which the following is a specification.

This invention relates to certain improvements in a talking board by means of which astrological data may be obtained in answer to questions asked, as well as answers through the medium of letters and words, as will hereinafter fully appear.

This invention consists, first, in the board proper; and secondly, in the device which is employed in connection with the board, and upon which the persons asking questions or those asked questions place their fingers, and which answers the purpose of a pointer as it is moved involuntarily over the surface of the board as hereinafter described.

In the description of the invention which follows, reference is made to the accompanying drawings forming a part hereof, and in which—

Figure 1:
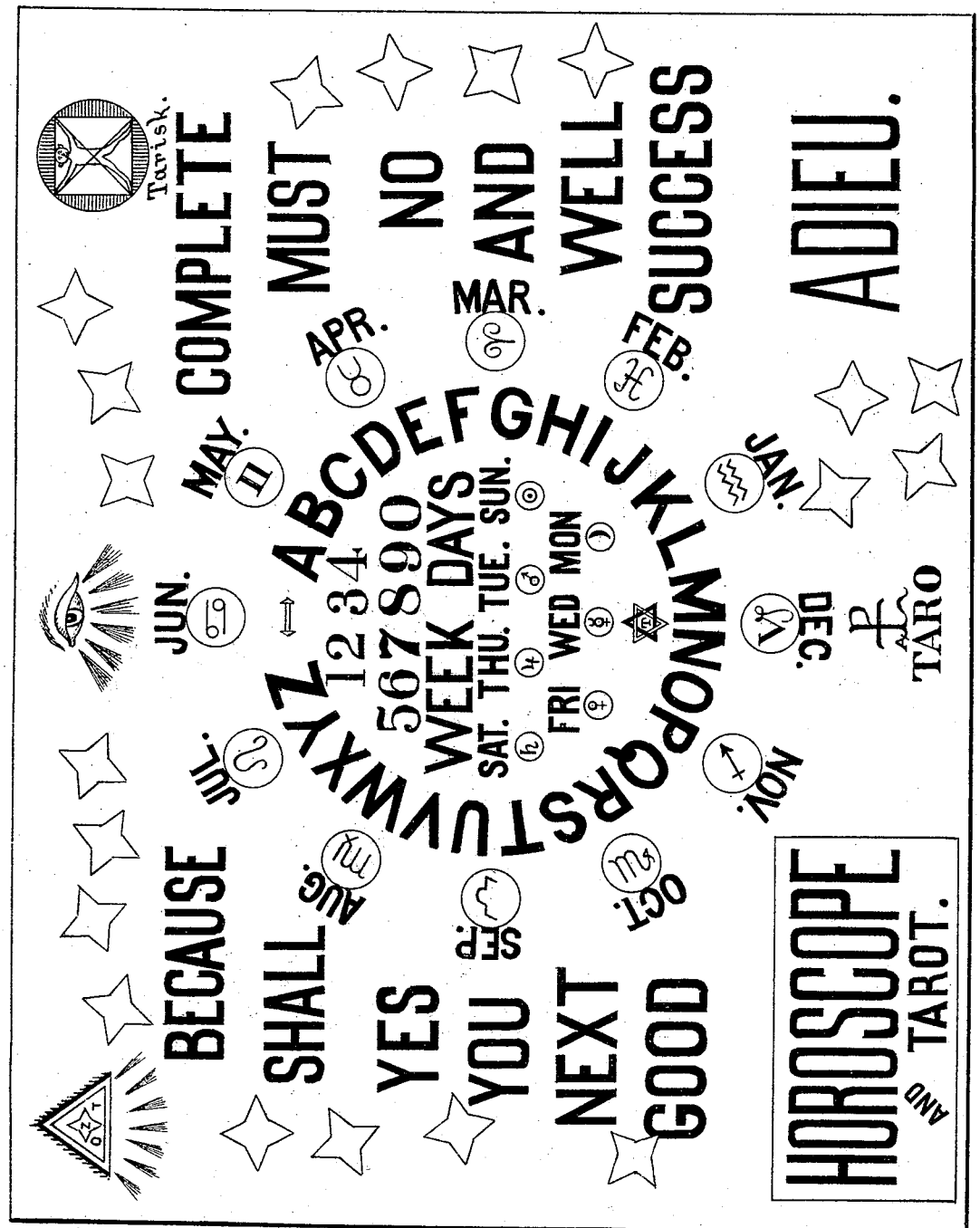
Figure 2:
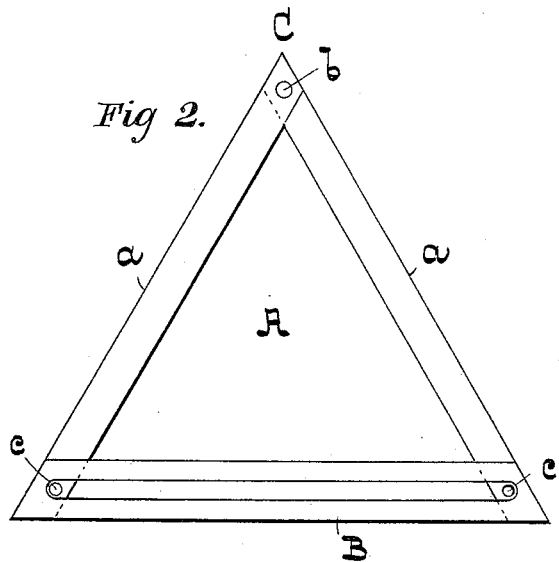
Figure 3:
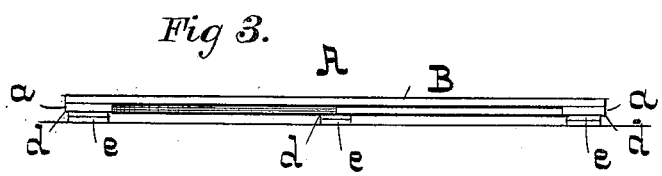

Figure 1 is a face view of the board, and Figs. 2 and 3 respectively, a plan, and an edge of the pointing device used as before stated in connection with the board in securing answers to questions.

The words, letters and symbols printed or inscribed on the board, and their relative arrangement consist as follows: At the upper left hand corner is a triangle, the lower side of which has rays extending therefrom, and within it a four cornered star and the letters "Z O T" which signify a secret. At the upper right hand corner is a figure which denotes the "endless" and immediately below this figure is the word "Tarisk" which is the zend word for "We require an answer." Centrally between these two symbols and on a horizontal line extending from one to the other, is what is termed "the all seeing eye" which signifies that no secret is hidden from it. Immediately below the eye and at the bottom of the board is a symbol and below it the word "Taro" which is of Egyptian origin and signifies the royal path, it being derived from "tar," path, and "ro," royal. At the left hand lower corner is the name of the talking board which consists of the words "Horoscope" and "Tarot" inclosed by a border line. Tarot which forms a part of the name of the invention is also an Egyptian word derived from "taru" which signifies an answer, or to consult, or that which is consulted, or that from which an answer is required, while the letter "T" is an Egyptian hieroglyphic final which is added to denote the feminine gender.

In the center of the board is the English alphabet arranged in a circle, and within this circle are the Arabic numerals or figures from 1 to 9 arranged in straight lines. Beneath these numerals are the words "Week days" and below them are the contractions of the names of the days of the week with the symbols of the astrological planets from which they are derived. Below all these and within the circle formed by the alphabet are two united triangles inclosing the letter "T." In a larger circle, concentric with the first, are the contractions of the names of the months of the year, and on radial lines extending from the names are the signs of the zodiac, each sign being opposite to the month governed by the same and inclosed in a circle.

At the sides of the board and exterior of the central circles are various words which may form answers to questions.

The field or surface of the board not occupied by letters, symbols and words, is studded with four pointed stars.

Referring now to Figs. 2 and 3, A is a triangle formed of two strips *a* of wood or other suitable material, pivoted together at *b*, and a strip B connected to the ends of the others *a*. To form this connection the strip B is slotted and the ones *a* provided with pins *c* which admit of the strips *a* being closed to some extent. The normal position of the three strips is the extended one, as shown in the drawings, but as before stated, the strips *a* may be drawn together. The angle at C constitutes the pointer.

At *d, d, d,* are felt cushions *e* which answer the purpose of legs and also reduce friction as the pointing triangle is moved on the surface of the board.

The device as described is placed on the board and two persons lay their fingers on the strips *a*. A movement of the device is soon noticed, and upon a question being asked the pointer moves to some word, letter or symbol, which constitutes an answer or an element of an answer. As the pointing device approaches any edge of the board a contraction of the strips takes place which admits of the device having a greater range of movement than if the triangle was a rigid device. Its collapsing operation usually prevents the triangular pointer from passing over the edge of the board.

I claim as my invention—

1. The combination, with a talking-board having signs, letters, figures and symbols disposed thereon, of a pointer designed to be moved over the said board, said pointer consisting of a longitudinally slotted base-piece, and two side pieces pivoted together at one end and having each a projection on the opposite end to engage the slot in the base-piece, the said base and sides forming a triangle, substantially as described.

2. As a new article of manufacture, a collapsible pointer for game apparatus, consisting of a base-piece having a longitudinal slot therein, two side-pieces pivoted together at one end and having each a projection on the opposite end to engage the said slot, and cushions or legs located near the ends of the sides, substantially as described.

MORITZ SCHIRMAN.

Witnesses:
WM. T. HOWARD.
GEO. E. TAYLOR.